125,987

UNITED STATES PATENT OFFICE.

JOHN T. ROBINSON, OF NEW YORK, N. Y., ASSIGNOR TO ISAAC U. COLES & CO., OF SAME PLACE.

IMPROVEMENT IN LUBRICATING-PACKINGS FOR JOURNALS.

Specification forming part of Letters Patent No. 126,987, dated May 21, 1872.

Specification describing a certain Compound called Packing for Car-Journals and Lubricator for Machinery, invented by JOHN T. ROBINSON, of the city, county, and State of New York.

The nature of this invention consists in mixing several oleaginous ingredients together, heating them, and adding hair, waste, or jute, for packing; or precipitating all foreign matter from the compound, while being manufactured, by an alkali, and thereby reducing it to a pure oil.

The following are the ingredients employed, in about the proportions necessary, and the manufacture of the compound, viz.: first, fifteen pounds of palm-oil; second, thirty pounds of neutral or paraffine oil, well mixed together and placed in a kettle; third, forty pounds of tallow; fourth, five pounds of alkali or alkalescent matter, which I heat to 360° Fahrenheit, stirring in the mean time until the oils are well mixed; fifth, ten pounds of fine powdered asbestus is added, and the mixture heated to 470° Fahrenheit. I now remove the mixture from the kettle and cool it; then press fifteen per cent. in weight of oil from it.

This compound may be mixed with hair, waste, or jute for car-journals, or used without them.

This compound is also a good substitute for tallow, one pound weight of the compound being found to be equal to four pounds of tallow in working use; and should it be desired to extract a pure oil from the mixture previous to removing the mixture from the kettle, and before adding the hair, waste, or jute, I mix a weak solution of alkali, which precipitates all foreign matter, leaving the pure oil to be run off.

What I claim is—

The compound herein described, as a new combination of matter, for the purposes set forth.

JOHN T. ROBINSON.

Witnesses:
ARTHUR NEILL,
JOHN DEVLIN.